United States Patent
Hatano et al.

(10) Patent No.: US 10,392,679 B2
(45) Date of Patent: Aug. 27, 2019

(54) METHOD FOR RECOVERING GOLD FROM ACTIVATED CARBON

(71) Applicant: JX NIPPON MINING & METALS CORPORATION, Tokyo (JP)

(72) Inventors: Kazuhiro Hatano, Hitachi (JP); Akira Yoshimura, Hitachi (JP); Ryosuke Tatsumi, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 85 days.

(21) Appl. No.: 15/539,552

(22) PCT Filed: Dec. 4, 2015

(86) PCT No.: PCT/JP2015/084218
§ 371 (c)(1),
(2) Date: Jun. 23, 2017

(87) PCT Pub. No.: WO2016/104113
PCT Pub. Date: Jun. 30, 2016

(65) Prior Publication Data
US 2017/0356066 A1    Dec. 14, 2017

(30) Foreign Application Priority Data

Dec. 26, 2014 (JP) ................. 2014-266245
Dec. 26, 2014 (JP) ................. 2014-266260

(51) Int. Cl.
| | | |
|---|---|---|
| C22B 3/24 | (2006.01) | |
| B01J 20/34 | (2006.01) | |
| B01J 38/48 | (2006.01) | |
| C22B 11/08 | (2006.01) | |
| C01B 17/033 | (2006.01) | |
| C22B 3/00 | (2006.01) | |

(52) U.S. Cl.
CPC .......... *C22B 11/08* (2013.01); *B01J 20/3416* (2013.01); *B01J 38/485* (2013.01); *C01B 17/033* (2013.01); *C22B 3/24* (2013.01); *C22B 11/04* (2013.01); *Y02P 10/234* (2015.11)

(58) Field of Classification Search
CPC ... C22B 3/04; C22B 11/08; C22B 3/24; B01J 20/20; B01J 20/34
See application file for complete search history.

(56) References Cited

U.S. PATENT DOCUMENTS

| | | | | |
|---|---|---|---|---|
| 4,824,656 A | * | 4/1989 | Rice ......................... | B01J 38/66 423/578.1 |
| 5,769,925 A | * | 6/1998 | Harvey ................... | C22B 11/04 210/684 |
| 6,200,364 B1 | | 3/2001 | Robles | |
| 6,238,632 B1 | * | 5/2001 | Kamps ................ | B01J 20/3416 252/184 |
| 2001/0008617 A1 | | 7/2001 | Robles | |
| 2013/0084271 A1 | | 4/2013 | Kelly et al. | |

FOREIGN PATENT DOCUMENTS

| | | | |
|---|---|---|---|
| AU | 1535083 | * | 12/1984 |
| AU | 2013200572 A8 | | 8/2013 |
| AU | 2013200947 A1 | | 9/2013 |
| CA | 2868296 A1 | | 10/2013 |
| JP | 3-30834 A | | 2/1991 |
| JP | 2013-147685 A | | 8/2013 |
| JP | 2014-4511 A | | 1/2014 |
| RU | 2064513 C1 | | 7/1996 |
| WO | WO9212779 | * | 8/1992 |
| WO | WO 2013/052101 A1 | | 4/2013 |
| WO | WO 2013/145849 A1 | | 10/2013 |
| WO | WO 2014/132419 A1 | | 9/2014 |

OTHER PUBLICATIONS

Ramirez-Muniz, Kardia et al. "Adsorption of the Complex Ion Au(Cn)2− onto Sulfur-Impregnated Activated Carbon in Aqueous Solutions" Journal of Colloid and Interface Science. vol. 349 pp. 602-606. doi:10.1016/j.jcis.2010.05.056. (Year: 2010).*

"Base metals." English Oxford Living Dictionaries. https://en.oxforddictionaries.com/definition/base_metal (Year: 2018).*

Notification of Transmittal of Translation of the International Preliminary Report on Patentability; International Preliminary Report on Patentability; and English translation of Written Opinion of the International Searching Authority for PCT/JP2015/084218, dated Jul. 6, 2017 (Forms PCT/IB/338, PCT/IB/373 and PCT/ISA/237).

International Search Report for PCT/JP2015/084218 (PCT/ISA/210) dated Dec. 28, 2015.

Written Opinion of the International Searching Authority for PCT/JP2015/084218 (PCT/ISA/237) dated Dec. 28, 2015.

English abstract of CL-2014001872-A1 (publication date: Oct. 3, 2014).

English abstract of CL-2014002292-A1 (publication date: Nov. 21, 2014).

English Abstract of CL-2014002592-A1 (publication date: Jan. 16, 2015).

* cited by examiner

*Primary Examiner* — Tima M McGuthry-Banks
(74) *Attorney, Agent, or Firm* — Birch, Stewart, Kolasch & Birch, LLP

(57) ABSTRACT

The present invention is intended for effectively removing copper, iron, sulfur, which are impurities, from activated carbon on which gold is adsorbed before gold eluting in the point of view of gold recovery, and is related to a method for eluting gold from an activated carbon on which at least sulfur (S) and gold (Au) are adsorbed, whereas the activated carbon is washed with an alkali solution before eluting the gold, and then the gold is eluted from the activated carbon.

15 Claims, No Drawings

METHOD FOR RECOVERING GOLD FROM ACTIVATED CARBON

TECHNICAL FIELD

The present invention relates to a method for eluting gold from activated carbon on which at least sulfur (S) and gold (Au) are adsorbed, and a method for recovering gold from the gold-containing solution obtained via the same.

In addition, the present invention relates to a method for eluting gold from activated carbon on which at least sulfur (S) and gold (Au), as well as either or both of copper (Cu) and Iron (Fe) are adsorbed, and a method for recovering gold from the gold-containing solution obtained via the same.

BACKGROUND ART

Gold is one of metals of great value and is present as simple fine particles in natural veins. As methods which are known for recovering gold, there are methods in which gold is eluted with a cyanide solution, and in which gold is recovered as mercury amalgam.

When gold is leached with a cyanide solution, gold is dissolved as cyanide complexes. It is known that cyanide complex of gold is more stable than other types of gold complex ion. The leached gold is usually adsorbed on activated carbon, and then eluted with an aqueous solution containing mainly sodium hydroxide. Thereafter, gold is recovered from the gold-containing eluent via electrowinning.

Patent Document 1 discloses a technique to elute gold from activated carbon on which gold was adsorbed. Specifically, gold complex is adsorbed on activated carbon, and then the activated carbon is separated by filtrating through a pulp, thereafter washed by hydrochloric acid, then subjected to a heating cyanide solution to elute gold complex from the activated carbon. This technique is named CIP (Carbon in pulp), and is known as a method to obtain high purity gold.

Patent Document 2 discloses a technique to elute gold from activated carbon with alkali such as sodium hydroxide. In addition, Patent Document 3 and 4 disclose a technique to elute gold from activated carbon with aqueous solution of thiosulfate such as sodium thiosulfate.

CITATION LIST

Patent Document

[Patent Document 1] Japanese Patent Publication 1991-30834
[Patent Document 2] Japanese Patent Publication 2013-147685
[Patent Document 3] WO2013/145849
[Patent Document 4] WO2013/052101

SUMMARY OF INVENTION

Technical Problem

By the way, when gold is eluted from activated carbon, the amount of eluted gold is smaller than that is adsorbed. In other words, it is considered that reagents used as an eluent react with impurities such as copper and iron, resulting in unnecessary consumption of reagents and an obstacle to gold elution. Accordingly, unnecessary usages of reagents were unavoidable, and the cost was high.

In addition, when leaching ore, the leaching solution is sometimes contaminated with sulfur, which results in the generation of $H_2S$ during gold electrowinning of gold-containing eluent. Therefore, gas suction devices and exhaust gas treatment equipment are required. Furthermore, when eluent is repeatedly dipped through activated carbon for elution, the generated $H_2S$ sometimes sulfurize impurities contained in activated carbon, and affect the consequence of gold elution.

Solution to Problem

The present inventors have constantly conducted studies for resolving the above-described problems, and as a result, found that at the last step of gold recovering, before eluting gold from activated carbon on which gold is adsorbed, washing the activated carbon with alkali can effectively help remove sulfur as an impurity in the point of view of gold recovering, or washing the activated carbon with acid and alkali can effectively help remove copper, iron, sulfur as impurities in the point of view of gold recovering, and can help elute gold efficiently. Consequently, the present invention is achieved.

Specifically, the present invention covers the following subject matters:

(1) A method for eluting gold from an activated carbon on which at least sulfur (S) and gold (Au) are adsorbed, wherein the activated carbon is washed with an alkali solution before eluting the gold, and then the gold is eluted from the activated carbon.

(2) A method for eluting gold from activated carbon on which at least sulfur (S) and gold (Au), as well as either or both of copper (Cu) and iron (Fe) are adsorbed, wherein the activated carbon is washed with an acid solution and an alkali solution before eluting the gold, and then the gold is eluted from the activated carbon.

(3) The method for eluting gold according to (2), wherein the acid solution used for washing is hydrochloric acid with a concentration of 0.1 to 5 mol/L.

(4) The method for eluting gold according to any one of (1) to (3), wherein a concentration of hydroxide ion in the alkali solution used for washing is more than 0.1 mol/L, and no more than 2.0 mol/L.

(5) The method for eluting gold according to any one of (1) to (4), wherein a temperature of the alkali solution is less than 50° C.

(6) The method for eluting gold according to any one of (1) to (5), wherein the activated carbon is obtained by contacting an activated carbon with a solution obtained by leaching gold from a copper sulfide ore containing gold or a gold ore.

(7) The method for eluting gold according to any one of (1) to (5), wherein the activated carbon is obtained by contacting an activated carbon with a solution obtained by leaching gold with a chloride media from a copper sulfide ore containing gold or a gold ore.

(8) The method for eluting gold according to any one of (1) to (7), wherein the gold is eluted with cyanide solution.

(9) A method for recovering a gold, wherein the gold is recovered by electrowinning from a gold-containing solution obtained by the method of eluting gold according to any one of (1) to (8).

Advantageous Effect of Invention

According to the present invention, it is possible to obtain highly purified gold solution by effectively removing sulfur, which is impurity, from the perspective of gold recovery, before eluting gold from activated carbon on which gold is adsorbed, and then by eluting gold from the same.

In addition, according to the present invention, it is possible to obtain highly purified gold solution by effectively removing copper, iron and sulfur, which are impurity, from the perspective of gold recovery, before eluting gold from activated carbon on which gold is adsorbed, and then by eluting gold from the same.

DESCRIPTION OF EMBODIMENTS

In accordance with an embodiment of the present invention, gold (Au) is eluted after other impurities are removed from activated carbon on which gold is adsorbed.

Namely, an exemplary embodiment of the present invention is a method for eluting Au from an activated carbon on which at least sulfur (S) and Au are adsorbed, whereas the activated carbon is washed with an alkali solution before eluting the gold to remove the sulfur from the activated carbon, and then the Au is eluted from the activated carbon.

Another exemplary embodiment of the present invention is a method for eluting gold from activated carbon on which at least sulfur (S) and Au, as well as either or both of copper (Cu) and iron (Fe) are adsorbed, whereas the activated carbon is washed with an acid solution and an alkali solution before eluting the gold to remove the Cu and/or Fe and S from the activated carbon, and then the gold is eluted from the activated carbon.

The activated carbon used in the present invention, can be obtained by contacting an activated carbon with a solution obtained by leaching gold from a copper sulfide ore containing gold or a gold ore with, for example, a chloride media. By the way, the activated carbon is possibly contaminated by sulfur (S) which comes from metal sulfide in the ore or the liquid chemicals used for leaching process. Sometimes, in addition to gold, copper (Cu) or iron (Fe) are adsorbed on the activated carbon, and sulfur (S) generated after removing Cu or Fe from the Cu or Fe in the form of sulfide, or sulfur (S) from the liquid chemicals may contaminate the activated carbon.

The above components are impurities from the perspective of gold recovery, and Cu, Fe reacts with the reagents used for eluting and thereby become a factor that inhibit gold elution. Further, if S is mixed into the eluent after gold eluting, $H_2S$ shall be unfavorably generated at the step of gold electrowinning.

From the above point of view, it is preferable to remove the above components, which are impurities, as much as possible.

Accordingly, S is efficiently removed from the activated carbon on which gold is adsorbed, by washing the same with alkali solution (alkali washing).

Besides, according to another exemplary embodiment of the present invention, the above elements are efficiently removed from the activated carbon on which gold is adsorbed, by washing the same by acid washing, and then by alkali washing.

When acid washing is conducted, Cu, Fe are removed by the acid washing.

Cu, Fe on activated carbon are considered existing in the form of hydroxide or oxide on the surface of the activated carbon, and are eluted with acid solution in which they are soluble during acid washing. For the purpose of avoiding deterioration of activated carbon while improving the solubility of Cu, Fe, the acid solution is preferably hydrochloric acid, and the concentration of the acid solution is preferably 0.1 to 5 mol/L.

Subsequently, S is removed by washing the activated carbon with alkali solution (alkali washing).

Because the S on activated carbon is soluble in alkali aqueous solution, it is eluted from the activated carbon via alkali washing. The alkali aqueous solution can be any kind as long as it is an alkaline solution, and is preferably NaOH aqueous solution, for example. In addition, because Au is sometimes eluted by alkali aqueous solution, the concentration of hydroxide ions in the alkali aqueous solution is preferably adjusted to a range that S can be eluted while Au is kept not eluted. Specifically, the concentration is preferably more than 0.1 mol/L, more preferably no less than 0.2 mol/L, more preferably no less than 0.5 mol/L, and is preferably no more than 2.0 mol/L, more preferably no more than 1.0 mol/L.

In addition, during the alkali washing, Au may be eluted if the temperature is too high. Therefore, for the purpose of not eluting Au, the temperature of washing solution is preferably less than 50° C., and more preferably 45° C. or less.

In addition, when acid washing is conducted, it is possible to initially conduct either acid washing or alkali washing. However, it is favorable to initially conduct washing utilizing the solution which has properties near to the solution used to adsorb Au on the activated carbon. For example, when the Au is adsorbed on the activated carbon by using a solution obtained by leaching gold with, for example, a chloride media from a copper sulfide ore containing gold or a gold ore, the solution is hydrochloric acid. And therefore, it is favorable to conduct acid washing, especially acid washing with hydrochloric acid before alkali washing.

Subsequently, to the activated carbon after the above impurities are removed, a eluent, for example, cyanide solution containing such as sodium cyanide, potassium cyanide or the like, and thiosulfate aqueous solution such as sodium thiosulfate, thiosulfate acid, potassium thiosulfate or the like, and alkali solution such as sodium hydroxide, mixture of sodium hydroxide and sodium sulfide or the like. Especially, cyanide solution is preferable because it can efficiently elute Au.

From the above, in another point of view, the present invention provides a method for preparing a solution containing gold by removing impurities on activated carbon on which Au is adsorbed, and then by eluting Au from the same.

Gold can be recovered by a routine procedure of electrowinning, from the solution containing gold obtained with the above method.

From the above, in another point of view, the present invention provides a method for recovering gold by electrowinning the solution containing gold obtained with the above method

EXAMPLES

The further detailed description for the present invention is provided below by way of Examples. However, it should be appreciated that the present invention is not limited to the following specific examples.

(Reference Example 1) Acid Washing

An activated carbon is obtained by contacting the same with a solution obtained by leaching gold with a chloride media from a copper sulfide ore containing gold. And then the activated carbon was washed according to the conditions demonstrated in Table 1. Further, as a content amount of Cu, Fe, Au, S before washing (A), after acid washing (B), after acid washing and water washing (C), respectively, the carbon analysis value, and removal rate of respective components during respective processes, which are estimated via the following procedure, are demonstrated in Table 2. In addition, the pulp density indicates the amount of activated carbon per 1 liter of washing water (the same applies to the following).

TABLE 1

Conditions for acid washing

| | Conditions for washing | | | |
|---|---|---|---|---|
| | Concentration of HCl [mol/L] | time(s) of acid washing [time(s)] | time(s) of water washing [time(s)] | pulp density [g/L] |
| Example 1 | 3 | 1 | 5 | 200 |
| Example 2 | 3 | 1 | 5 | 200 |
| Example 3 | 0.3 | 1 | 2 | 200 |

TABLE 2

Results of acid washing

| | | carbon analysis value | | | | removal rate | | | |
|---|---|---|---|---|---|---|---|---|---|
| | | Cu PPM | Fe PPM | Au PPM | S % | Cu % | Fe % | Au % | S % |
| Example 1 | A | 8181 | 5820 | 10400 | 0.63 | 0% | 0% | 0% | 0% |
| | B | 3578 | 6050 | 15800 | 0.526 | 56% | 0% | 0% | 17% |
| | C | 339 | 4110 | 13300 | 0.576 | 96% | 29% | 0% | 9% |
| Example 2 | A | 13300 | 10800 | 6468 | 0.585 | 0% | 0% | 0% | 0% |
| | B | 4649 | 7850 | 11000 | 0.366 | 65% | 27% | 0% | 37% |
| | C | 506 | 5440 | 8600 | 0.5 | 96% | 50% | 0% | 15% |
| Example 3 | A | 17949 | 20513 | 3333 | | 0% | 0% | 0% | |
| | B | 1600 | 13000 | 3900 | | 91% | 37% | 0% | |
| | C | 630 | 9600 | 4200 | | 96% | 53% | 0% | |

Carbon analysis value: the proportion of respective components to the carbon, gold and other impurities as a whole in the activated carbon. The value is measured with a conventional analytical method for activated carbon, namely, a method of totally dissolving the carbon and analyzing the solution via inductively coupled plasma (ICP) or inductively coupled plasma mass spectrometry (ICP-MS).

Removal rate: the proportion of removed respective components after respective washing process. Is can be estimated via the following formula. In the formula, weight indicates the dry weight of each activated carbon, and the analysis value indicates the carbon analysis value.

{(the weight of activated carbon(adsorbate included) before washing)*(analysis value)}−{(the weight of activated carbon(adsorbate included) after washing)*(analysis value)}/{(the weight of activated carbon(adsorbate included)before washing)*(analysis value)}

(Reference Example 2) the Effect of Acid Washing on the Elution Rate of Au

To estimate the difference of the elution rate of Au when acid washing was or was not conducted before alkali washing, a sample which was subjected to acid washing including 2 times of washing under the condition of hydrochloric acid: 1 mol/L; 2.4 bed volume (BV: amount of solution/volume of activated carbon, in other words, 2.4 times of the amount of solution to the volume of activated carbon); 1 hour circulation, and then 10 times of washing under the condition of water: 2.4 bed volume, as long as a sample which was not subjected to acid washing, were then subjected to a routine procedure of Au eluting, and the carbon analysis values of each were analyzed to discover the content amount of Cu, S, Au contained respectively. The results are demonstrated in Table 3

TABLE 3

The effect of acid washing on the elution rate of Au

| | | carbon analysis value | | | Carbon analysis value of Au after eluting (elution rate) |
|---|---|---|---|---|---|
| | operation | Au PPM | Cu PPM | S % | |
| Example 4 | before washing | 3360 | 2003 | 0.6 | 2375 (29%) |
| | after HCl washing | — | — | — | |
| Example 5 | before washing | 3003 | 20197 | 0.6 | 824 (73%) |
| | after HCl washing | 3079 | 426 | 0.6 | |

In the table, the carbon analysis value was measured with the abovementioned method. In addition, the elution rate was calculated by the formula: 100−(carbon analysis value of Au after eluting)/(carbon analysis value of Au before eluting)*100.

(Embodiment 1) Alkali Washing

An activated carbon is obtained by contacting the same with a solution obtained by leaching gold with a chloride media from a copper sulfide ore containing gold. And then the activated carbon was washed according to the conditions demonstrated in Table 4. Further, the carbon analysis values of Cu, Fe, Au, S before alkali washing, and after alkali washing were measured to discover the content amount of each. Moreover, the removal rate of respective components and the amount of eluted Au, the elution rate of Au were measured. The above values are demonstrated in Table 5. In addition, the carbon analysis value and removal rate in Table 5 were calculated with the abovementioned method.

TABLE 4

Conditions for alkali washing

| | washing condition | | | |
|---|---|---|---|---|
| | temperature | NaOH concentration [mol/L] | washing time [hr] | pulp density [g/L] |
| Example 6 | 45° C. | 1 | 96 | 50 |
| Example 7 | 45° C. | 1 | 20 | 50 |
| Example 8 | 45° C. | 1 | 72 | 50 |
| Example 9 | room temperature | 1 | 96 | 50 |
| Example 10 | room temperature | 0.1 | 96 | 50 |
| Example 11 | room temperature | 1 | 96 | 50 |
| Example 12 | 50° C. →60° C. | 1 | 96 | 88 |
| Example 13 | 60° C. | 1 | 24 | 95 |
| Example 14 | 55° C. | 1 | 24 | 88 |
| Example 15 | 50° C. | 1 | 24 | 88 |
| Example 16 | 50° C. | 1 | 24 | 96 |
| Example 17 | not heated | 1 | 48 | 95 |
| Example 18 | 45° C. | 1 | 24 | 135 |

TABLE 5

Results of alkali washing

| | carbon analysis value | | | | | | | | removal rate (carbon analysis value) | Au elution during washing | |
| --- | --- | --- | --- | --- | --- | --- | --- | --- | --- | --- | --- |
| | before alkali washing | | | | after alkali washing | | | | | analysis value of solution (mg/L) | elution rate % |
| | Au [g/t] | S [%] | Cu ppm | Fe ppm | Au [g/t] | S [%] | Cu ppm | Fe ppm | S [%] | | |
| Example 6 | 820 | 4 | 7740 | 13300 | 872 | 0.924 | 13100 | 14600 | 78% | 0.02 | 0.0% |
| Example 7 | 797 | 4 | 561 | 10200 | 837 | 0.549 | 798 | 10800 | 87% | 0.375 | 0.8% |
| Example 8 | 797 | 4 | 561 | 10200 | 841 | 0.323 | 895 | 10200 | 92% | 0.285 | 0.7% |
| Example 9 | 797 | 4 | 561 | 10200 | 864 | 0.677 | 771 | 10500 | 84% | 0.16 | 0.0% |
| Example 10 | 797 | 4 | 561 | 10200 | 724 | 5.97 | 748 | 10100 | 0% | 0.32 | 0.9% |
| Example 11 | 797 | 4 | 561 | 10200 | 815 | 1.83 | 907 | 10700 | 56% | 0 185 | 0.6% |
| Example 12 | 441 | 0 | no analysis value | | 475 | 0.146 | 619 | 17500 | 64% | 0.24 | 0.0% |
| Example 13 | 760 | 8 | 341 | 7560 | 710 | 0.304 | 624 | 8000 | 96% | 0.955 | 1.4% |
| Example 14 | 637 | 5 | 509 | 8161 | 848 | 0.304 | 501 | 8170 | 94% | no data | |
| Example 15 | 637 | 5 | 509 | 8161 | 750 | 0.384 | 772 | 8660 | 93% | 1.205 | 2.9% |
| Example 16 | 637 | 5 | 509 | 8161 | 669 | 0.546 | 411 | 9510 | 90% | 0.785 | 1.7% |
| Example 17 | 637 | 5 | 509 | 8161 | 560 | 0.946 | 725 | 11200 | 82% | 0.12 | 0.0% |
| Example 18 | 441 | 3 | 129 | 7490 | 506 | 0.573 | 530 | 8970 | 83% | 0.225 | 0.5% |

In the table, the analysis value of solution and elution rate, which are intended for estimate the Au elution during washing, are measured with the following method.

Analysis value of solution: by analyzing the amount of eluted Au in the washing solution via ICP or ICP-MS.

Elution rate: the value calculated with the formula:
(the amount of Au eluted into the solution)/(the amount of Au before washing)*100.

In addition, in the above formula, the amount of Au eluted into the solution was calculated with the formula: analysis value of solution (mg/L)*liquid volume (L), the amount of Au before washing was calculated with the formula: the amount of carbon used*the analysis value of Au in the carbon.

Besides, elution rate was calculated from the analysis value of washing solution, assuming that the elute rate reaches 100% when all amount of Au adsorbed on carbon is eluted.

Embodiment 2

An activated carbon is obtained by contacting the same with a solution obtained by leaching gold with a chloride media from a copper sulfide ore containing gold. And then the activated carbon was washed according to the conditions demonstrated in Table 6. Further, the carbon analysis values of Cu, Fe, Au, S before alkali washing, and after alkali washing were measured to discover the content amount of each. Moreover, the removal rate of respective components and the amount of eluted Au, the elution rate of Au were measured. The above values are demonstrated in Table 7. In addition, the carbon analysis value and removal rate in Table 7 were calculated with the abovementioned method.

TABLE 6

Conditions for acid washing and alkali washing

| Washing condition | acid washing | hydrochloric acid washing 1 mol/L, 2.4 BV, 1 h circulation * 2 times →water washing after acid washing 2.4 BV, 1 h circulation * 10 times |
| --- | --- | --- |
| | alkali washing | NaOH washing 1 mol/L, 3.3 BV, 24 h circulation * 1 time →water washing after NaOH washing 3.3 BV, 24 h circulation * 2 times |

TABLE 7

Results of acid washing and alkali washing

| | | amount of carbon kg-dry | carbon analysis value | | | | removal rate | | | |
| --- | --- | --- | --- | --- | --- | --- | --- | --- | --- | --- |
| | | | Au PPM | Cu PPM | Fe PPM | S % | Au % | Cu % | Fe % | S % |
| Example 19 | before washing | 139.9 | 399 | 16500 | 22300 | 0.566 | 0% | 0% | 0% | 0% |
| | after HCl washing | 111.3 | 422 | 414 | 14300 | 0.858 | 16% | 98% | 49% | 0% |
| | after NaOH washing | 129.5 | 362 | 771 | 11500 | 0.201 | 16% | 96% | 52% | 67% |
| Example 20 | before washing | 156.0 | 891 | 2679 | 14100 | 4.92 | 0% | 0% | 0% | 0% |
| | after HCl washing | 149.1 | 1120 | 561 | 12500 | 2.29 | 0% | 80% | 15% | 55% |
| | after NaOH washing | 133.4 | 1120 | 645 | 11100 | 0.15 | 0% | 79% | 33% | 97% |
| Example 21 | before washing | 134.3 | 782 | 16700 | 18300 | 1.05 | 0% | 0% | 0% | 0% |
| | after HCl washing | 107.7 | 793 | 759 | 10200 | 1.03 | 19% | 96% | 55% | 21% |
| | after NaOH washing | 102.1 | 728 | 784 | 8480 | 0.131 | 29% | 96% | 65% | 91% |

According to the Reference Example 1, when only acid washing was conducted before eluting gold from activated carbon on which gold and impurities comprising Cu, Fe, S, the removal rate of S was not sufficient. On the other hand, according to the Reference Example 2, when only acid washing was conducted before eluting gold, improvement of the elution rate of Au was confirmed, but S was merely removed.

According to Embodiment 1, when only alkali washing was conducted before eluting gold, the removal rate of Cu, Fe were insufficient, but S was efficiently removed. Therefore, it is obvious that the method is practical when removal of Cu, Fe is not necessary in the point of view of gold recovery.

Moreover, according to Embodiment 2, when both acid washing and alkali washing were conducted before eluting gold, impurities comprising Cu, Fe, S are all removed, indicating that the method is highly practical in the point of view of gold recovery.

Furthermore, after acid washing, alkali washing, it is possible to obtain a gold-containing solution by eluting gold adsorbed on the activated carbon with cyanide solution, thiosulfate or alkali solution. And the gold-containing solution can be subjected to gold electrowinning by a routine procedure.

However, if Cu, Fe are adsorbed on the activated carbon, complex of these components can be generated while gold is eluted with cyanide solution, along with complex of gold, thereby consuming cyanide reagent which was intended for gold eluting. As a result, it is considered that the amount of cyanide ions for gold eluting decreases, and the elution rate of gold becomes worse.

In addition, when thiosulfate is used for gold eluting, the residual Cu, Fe adsorbed on the activated carbon may decompose the thiosulfate, thereby reducing the amount of thiosulfate ions which were intended for gold eluting. As a result, the elution rate of gold becomes worse.

In addition, when sodium hydroxide is used for gold eluting, the residual Cu, Fe adsorbed on the activated carbon may become hydroxide, consuming alkali and thereby lowering the pH. Therefore, additional reagent shall be necessary to raise the pH.

Moreover, if S is still adsorbed on the activated carbon, when alkali solution is used for gold eluting, the residual S on the activated carbon may be eluted along with gold. Because of the existing S in the gold-containing solution after eluting, hydrogen sulfide shall be generated during gold electrowinning.

The invention claimed is:

1. A method for eluting gold from an activated carbon on which at least sulfur (S) and gold (Au) are adsorbed, wherein the activated carbon is washed with an alkali solution to remove sulfur (S) before eluting the gold, and then the gold is eluted from the activated carbon.

2. The method for eluting gold according to claim 1, wherein a concentration of hydroxide ion in the alkali solution used for washing is more than 0.1 mol/L, and no more than 2.0 mol/L.

3. The method for eluting gold according to claim 1, wherein a temperature of the alkali solution is less than 50° C.

4. The method for eluting gold according to claim 1, wherein the activated carbon is obtained by contacting an activated carbon with a solution obtained by leaching gold from a copper sulfide ore containing gold or a gold ore.

5. The method for eluting gold according to claim 1, wherein the activated carbon is obtained by contacting an activated carbon with a solution obtained by leaching gold with a chloride media from a copper sulfide ore containing gold or a gold ore.

6. The method for eluting gold according to claim 1, wherein the gold is eluted with cyanide solution.

7. A method for recovering a gold, wherein the gold is recovered by electrowinning from a gold-containing solution obtained by the method of eluting gold according to claim 1.

8. A method for eluting gold from activated carbon on which at least sulfur (S) and gold (Au), as well as either or both of copper (Cu) and iron (Fe) are adsorbed, wherein the activated carbon is washed with an acid solution to remove copper (Cu) and iron (Fe) and an alkali solution to remove sulfur (S) before eluting the gold, and then the gold is eluted from the activated carbon.

9. The method for eluting gold according to claim 8, wherein the acid solution used for washing is hydrochloric acid with a concentration of 0.1 to 5 mol/L.

10. The method for eluting gold according to claim 8, wherein a concentration of hydroxide ion in the alkali solution used for washing is more than 0.1 mol/L, and no more than 2.0 mol/L.

11. The method for eluting gold according to claim 8, wherein a temperature of the alkali solution is less than 50° C.

12. The method for eluting gold according to claim 8, wherein the activated carbon is obtained by contacting an activated carbon with a solution obtained by leaching gold from a copper sulfide ore containing gold or a gold ore.

13. The method for eluting gold according to claim 8, wherein the activated carbon is obtained by contacting an activated carbon with a solution obtained by leaching gold with a chloride media from a copper sulfide ore containing gold or a gold ore.

14. The method for eluting gold according to claim 8, wherein the gold is eluted with cyanide solution.

15. A method for recovering a gold, wherein the gold is recovered by electrowinning from a gold-containing solution obtained by the method of eluting gold according to claim 8.

* * * * *